Figure 1:
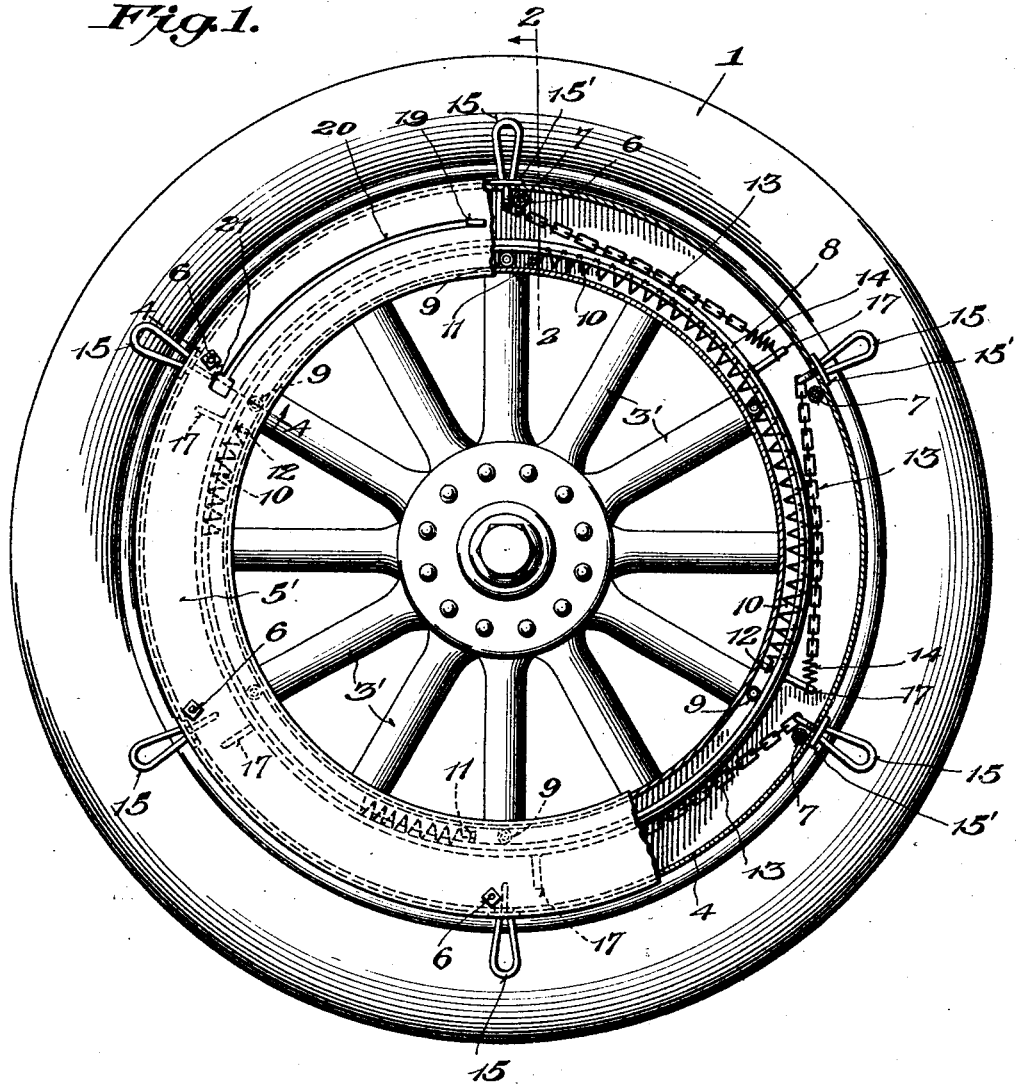

A. L. FORREST.
NONSLIPPING ATTACHMENT FOR VEHICLE WHEELS.
APPLICATION FILED JUNE 26, 1920.

1,409,940.

Patented Mar. 21, 1922.
2 SHEETS—SHEET 1.

Witness:—
Chas. L. Griesbauer

Inventor
Alfred L. Forrest,
By Harry H. Semmes
Attorney

UNITED STATES PATENT OFFICE.

ALFRED L. FORREST, OF BALTIMORE, MARYLAND.

NONSLIPPING ATTACHMENT FOR VEHICLE WHEELS.

1,409,940.  Specification of Letters Patent.  Patented Mar. 21, 1922.

Application filed June 26, 1920. Serial No. 391,899.

*To all whom it may concern:*

Be it known that I, ALFRED L. FORREST, a subject of the King of Great Britain, residing at Baltimore, in the State of Maryland, have invented certain new and useful Improvements in Nonslipping Attachments for Vehicle Wheels, of which the following is a specification.

My invention relates to a non-skid device for attachment to automobile tires to prevent slipping of the surface of the tire on wet streets or roads, thus insuring positive action of the brakes and safe operation of the car.

More particularly my invention relates to a quickly detachable chain device for use in wet weather or on slippery roads, which may be attached within a few seconds and as quickly detached, and which is adapted to be carried continuously on the wheel of the vehicle.

Heretofore, there have been two types of non-skid devices in use on wheels of motor vehicles. One type in customary use is the non-skid tire. The non-skid tire consists in a rubber surfaced tire which is deeply serrated or cut to form road-engaging spurs or ridges of rubber. With tires constructed in accordance with the non-skid patterns in general use, considerable difficulty has been experienced by reason of the fact that they do not hold positively on wet or slippery footing, and moreover, after a certain period of use the spurs or ridges of rubber became worn, and this renders them still more ineffective. The other type of non-skid device consists of chains adapted to fit over the exterior of the tires. These chains afford an efficient traction surface on slippery roads, but they are subject to the great disadvantage that it is a work of considerable time to remove them or place them in position. Moreover, on muddy roads the work of placing chains on wheels is extremely dirty and disagreeable.

It is to overcome the objectionable features of the existing types of non-skid devices for wheels that this invention is conceived. My invention consists of a plurality of chains adapted to be carried within a housing fastened to the rim of the automobile wheel. These chains are spring-tensioned and normally drawn within the case, but may be withdrawn from the casing against the spring tension and locked across the tread of the tire, so that they form a chain tread that may be quickly snapped into place or disengaged and drawn back within the casing.

An object of my invention is to provide a quickly detachable and adjustable chain tread for automobile tires.

Another object is to provide a chain tread for automobiles which can be constantly carried by the tire, and yet presents no unsightly appearance, which is instantly ready for use, and at the same time simple and durable in construction.

With such objects in view as well as other advantages which may be incident to the use of the improvement the invention consists in the parts and combinations thereof, hereinafter set forth and claimed, with the understanding that the several necessary elements constituting the same may be varied in proportion and arrangement without departing from the nature and scope of the invention.

In order to make the invention more clearly understood, there are shown in the accompanying drawings means for carrying the same into practical effect, without limiting the improvements in their useful applications to the particular constructions, which for the purpose of explanation have been made the subject of illustration.

Figure 2:
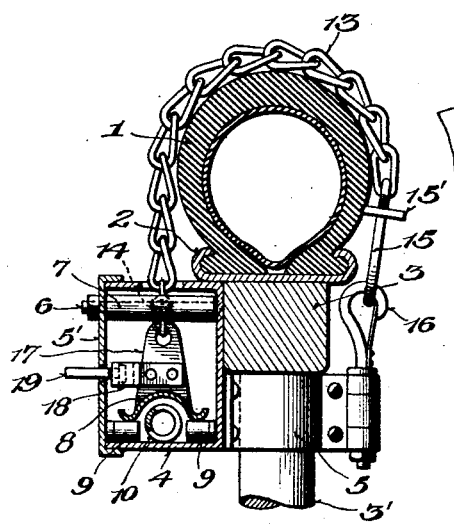
Figure 3:
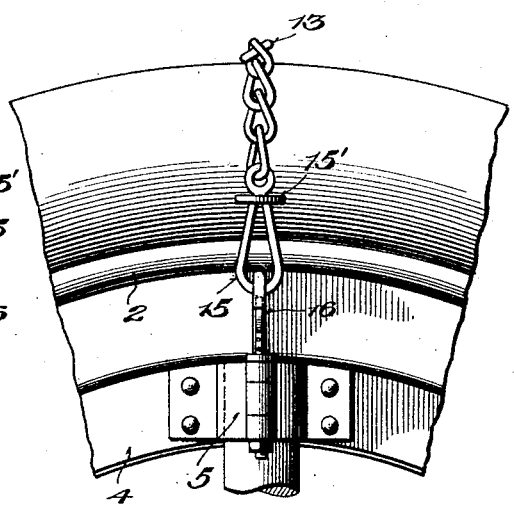
Figure 4:
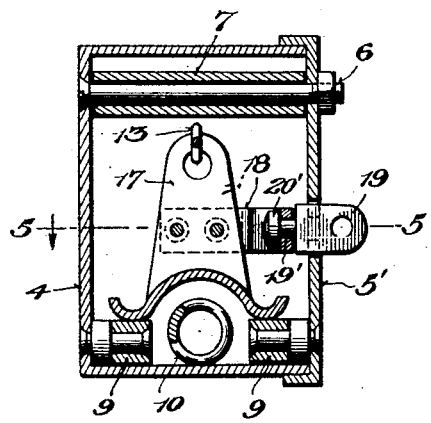
Figure 5:
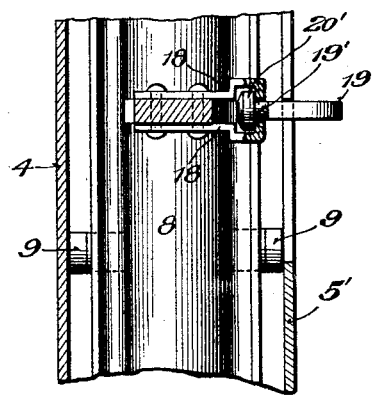

In the drawing Fig. 1 shows a side elevation with a portion of the structure broken away to more clearly show the position of the parts. Fig. 2 denotes a cross-sectional view taken through the tire on lines 2—2 of Fig. 1. Fig. 3 is a detail of the snap hook structure shown in Fig. 2. Fig. 4 is a cross-sectional view taken on line 4—4 of Fig. 1. Fig. 5 is a view of a section taken on lines 5—5 of Fig. 4.

Referring to the drawings, the numeral 1 designates a pneumatic vehicle tire attached to a metallic rim 2 that is carried on a felly 3 of the wheel proper. Spokes 3′ are adapted to fit into and carry the felly 3. A metallic case 4 is adapted to fit against the felly 3 of the tire, and is carried by means of holding clamps 5, to which the metallic case 4 is suitably riveted or bolted. The holding clamps 5 fit around the spokes and are riveted or bolted in place so that they tightly engage the spokes 3′ and act as a firm support for the metallic case 4. The case 4 is provided with a metallic cover 5′ which fits over the open portion of casing 4, as plainly shown in Fig. 2, and is bolted thereto by means of bolts 6.

Mounted upon the portion of the bolt 6 passing through the interior of the case 4 are rollers 7, which are adapted to rotate, and allow the chain to be freely drawn from the casing 4, or retracted to an inoperative position inside. Mounted within the casing 4 is a metallic sliding annular member 8, substantially of U-shape. This annular member extends completely around the circumference of the wheel and is adapted to slide upon rollers 9, mounted at the bottom of the metallic casing 4. These rollers 9 allow the sliding annular member 8 to slide freely in either direction of rotation. Mounted within the space bounded by the rollers 9 and the sliding annular member 8 are helical springs 10, attached through lugs 11 to the sliding annular member, and fixed at their other end to lugs 12, mounted on the casing 4.

Within the casing are housed chains 13, having a spring portion 14, to permit sudden jars or strains to be taken up within the chain structure. At one end of the chain, and lying exteriorly of the casing 4, are gripper links 15, having shoulders 15' which preclude the entrance of the gripper links to the interior of the casing 4, through the openings provided within the casing for the passage of the chain 13. On the opposite side of the wheel from the casing 4, and mounted upon the holding clamps are snap hooks 16 of the usual type which are adapted to cooperate with the gripper links 15, and hold the chains 13 in operative position upon the tire. The chains 13 are attached through springs 14, to lugs 17 formed on the sliding annular member 8 so that when the number 8 is rotated against the tension of the springs 10, the chains 13 may be drawn over the rollers 7 through the apertures in the casing 4.

The construction of the chains 13 with the spring section 14 permits sudden strains such as occur upon quick application of the brakes to be taken up within the chain structure, and to relieve in part the casing 4 and sliding annular member 8 from these strains.

In practice it has proven a difficult matter to withdraw the chains 13 from the casing by simply pulling upon the gripper links 15, and the strain upon the rollers 7 is in some instances so great that they have been injured. To obviate this difficulty, one of the lugs 17 has attached to it by rivets or bolts, as plainly indicated in Fig. 5, supports 18 which rotatively support a key 19 constructed of a flat metal strip and adapted to rotate upon a shaft 19' that passes through the supports 18. The key 19 is formed with a hole therethrough into which can be fitted any pointed instrument so that strong manual traction can be exerted upon the key. A head 20' holds the key 19 to the supports 18. The casing 4 is constructed with a slot 20 through which the key 19 is adapted to slide when the narrow side of the key engages the slot. Fig. 1 shows the position of the key within the slot 20 when the chains are in retracted position within the casing 4. One end of the slot 20 is provided with an enlarged rectangular opening 21 of such dimensions that the key 19 may be rotated so that its large dimension prevents its passage back again into the slot 20. The enlarged portion 21 is of sufficient length to allow considerable play of the key 19 and hence sliding annular member 8 so that sudden strains may be compensated for.

In operation all that is necessary to do is to slide the key 19 through the slot 20 till it comes to the enlarged portion 21 of the slot and then to turn it at right angles. This precludes the passage of the key 19 back through the slot 20 and locks the sliding annular member 8 in such a position that the chains may be readily withdrawn through the opening in the casing 4 by grasping the gripper links 15. The chains slide out easily over the rollers 7 and the gripper links are snapped in place, across the tread of the tire, through the snap hooks 16. Any great strain upon any one of the chains 13 will be compensated for through the main springs 10 by reason of the fact that the slot 21 is long enough to allow sufficient motion of the sliding annular member 8 to permit the lugs 17 to pass directly under the opening in the casing 4. Minor strains will be compensated for by the spring sections 14 forming part of the chains.

It will be seen that I have devised a structure which is simple and durable and performs a useful and much needed function without in any way spoiling the appearance of the wheels.

While I have shown but one embodiment of my invention it will be understood that many changes can be made therein by those skilled in the art, without departing from the spirit thereof and I desire, therefore, that my invention be limited only by the appended claims, and by the showing of the prior art.

What I claim is:

1. A tire chain device for automobile wheels comprising a plurality of chains adapted to fit over the tire, a sliding annular member, and a spring operating on said annular member to apply tension to all of the chains simultaneously.

2. A tire chain device for automobile wheels comprising a plurality of chains adapted to fit over the tire, a sliding annular member, a spring operating on said annular member, means on the spring attached to the sliding annular member, and means on the other end of the spring attached to the wheel construction so that tension may be applied to all of the chains simultaneously.

3. A tire chain device for automobile wheels comprising a plurality of chains adapted to fit over the tire, a sliding annular member, lugs on the annular member to which the chains are attached at one end, and a spring on the annular member to apply tension to all of the chains simultaneously.

4. A tire chain device for automobile wheels comprising a plurality of chains adapted to fit over the tire, a spring section in each chain, a sliding annular member and a spring operating on said annular member for tensioning all of the chains simultaneously.

5. A tire chain device for automobile wheels comprising a plurality of chains adapted to fit over the tire, a spring section in each chain, a gripper link attached to each chain, a snap hook for each chain carried by the wheel structure, a sliding annular member to which all of the chains are connected, and means operating on said annular member to apply tension to all of the chains simultaneously.

6. A tire chain device for automobile wheels comprising a plurality of chains adapted to fit over the tire, a sliding annular member, a casing for the annular member, and means operating on said annular member to apply tension to the chains.

7. A tire chain device for automobile wheels comprising a plurality of chains adapted to fit over the tire, a spring section in each chain, a gripper link attached to each chain, a snap hook for each chain carried by the wheel, a sliding annular member to which all the chains are connected, a casing for the annular member, and means operating on said annular member to apply tension to the chains simultaneously.

8. A tire chain device for automobile wheels comprising a plurality of chains, a gripper link attached to each chain, a sliding annular member, a casing for the annular member, means on each gripper link precluding it being drawn into the casing, and means operating on said annular member to apply tension to the chains.

9. A tire chain device for automobile wheels comprising a plurality of chains adapted to fit over the tire, a sliding annular member, rollers against which the annular member is adapted to slide, and means operating on said annular member to apply tension to the chains.

10. A tire chain device for automobile wheels comprising a plurality of chains adapted to fit over the tire, a sliding annular member, a casing for the annular member, means operating on said annular member to apply tension to the chains, and means attached to the sliding member whereby it may be rotated against the tensioning means and locked in position.

11. A tire chain device for automobile wheels comprising a plurality of chains adapted to fit over the tire, a sliding annular member, means operating on said annular member to apply tension to the chains, a key attached to the annular member cooperating with a slot in the casing, whereby the annular member may be rotated against the tensioning means and locked.

12. A tire chain device for automobile wheels comprising a plurality of chains adapted to fit over the tire, a spring section in each chain, a gripper link in each chain, a snap hook, a sliding annular member, means operating on said annular member to apply tension to the chains, and a key attached to the annular member cooperating with a slot in the casing, whereby the annular member may be rotated against the tensioning means and locked.

In testimony whereof I affix my signature.

ALFRED L. FORREST.